United States Patent [19]

Federico et al.

[11] 4,349,776

[45] Sep. 14, 1982

[54] DC-TO-DC CONVERTERS UTILIZING FET DEVICES

[75] Inventors: Joseph Federico, Berkeley Heights; Sigurd G. Waaben, Princeton, both of N.J.

[73] Assignee: Bell Telephone Laboratories, Incorporated, Murray Hill, N.J.

[21] Appl. No.: 198,286

[22] Filed: Oct. 20, 1980

[51] Int. Cl.³ .............................................. G05F 1/60
[52] U.S. Cl. .................................. 323/222; 323/224; 323/902
[58] Field of Search ................ 323/221, 222, 224, 225, 323/232, 271, 272, 282, 350, 351, 902; 363/15, 16, 97, 124, 22, 24; 307/311

[56] References Cited

U.S. PATENT DOCUMENTS

| | | | |
|---|---|---|---|
| 3,895,241 | 7/1975 | Cooper | 307/311 |
| 3,986,097 | 10/1976 | Woods | 363/22 |
| 4,143,287 | 3/1979 | Biggs | 307/311 |
| 4,178,629 | 12/1979 | Allen et al. | 363/97 X |

OTHER PUBLICATIONS

"VMOS Transistors as Fast Switches", Elektron. Entwickl.(Germany), vol. 13, No. 10, Oct. 1978, pp. 66–72.
"Using the Power MOSFET's Integrated Reverse Rectifier", Proceeding of the 7th National Solid-State Power Conversion Conf., Mar., 1980, pp. J2-1–J2-11.
"Driving the SIPMOS FET as a Fast Switch", Siemens R&D Report, vol. 9, No. 4, 1980, pp. 200-204.
"Power MOS FET's Run Directly off TTL", Electronics, Aug. 28, 1980, pp. 145-147.

Primary Examiner—William M. Shoop
Assistant Examiner—Peter S. Wong
Attorney, Agent, or Firm—Lucian C. Canepa

[57] ABSTRACT

Light-activated power FETs (18, 20, 80, 82) are utilized as switching elements in DC-to-DC converters. The FETs are characterized by high speed and low losses. As a result, the converters are capable of providing very low DC voltages in an efficient low-cost way.

8 Claims, 4 Drawing Figures

DC-TO-DC CONVERTERS UTILIZING FET DEVICES

BACKGROUND OF THE INVENTION

This invention relates to voltage converters and, more particularly, to direct current (DC)-to-DC converters that include field-effect-transistor (FET) switching devices.

Typical large-scale-integrated (LSI) circuits require power sources that supply relatively small positive DC voltages such as +5 volts. In many system environments, relatively large DC voltages (for example, +24 volts or −24 volts) are available. Circuits are known for converting these relatively large DC voltages to the smaller values needed for powering LSI devices. These known circuits include, for example, asymmetrically conducting diode elements whose losses are relatively high and bipolar transistor switches whose speed of operation is relatively slow.

Currently, much effort in the electronics industry is being directed at developing so-called very-large-scale-integrated (VLSI) circuits. Some of the supplies for powering these circuits are designed to provide extremely low DC voltages (for example, +2.5 volts or even as low as +0.5 volts). Moreover, as the trend toward microminiaturization intensifies, it is becoming increasingly important that the converters for providing these low DC voltages be small, inexpensive and characterized by extremely low losses.

Accordingly, considerable efforts have been directed by workers in the field at trying to devise small, inexpensive and low-power-loss DC-to-DC converters. It was recognized that such converters, if available, would expedite the development of commercially feasible VLSI circuits.

SUMMARY OF THE INVENTION

Hence, an object of the present invention is to provide improved DC-to-DC converters. More specifically, an object of the present invention is to provide small, inexpensive and low-loss DC-to-DC converters for supplying low voltages suitable for VLSI applications.

Briefly, these and other objects of the present invention are realized in specific illustrative embodiments thereof in which power FET switching devices characterized by high speed and low losses are utilized in DC-to-DC converters that each include an inductor and an output capacitor. In each embodiment, a gated FET switch is connected in parallel with a conventional diode. When the FET switch is gated OFF, the diode functions as a conventional asymmetrical blocking element. When the switch is gated ON, the diode is shunted with a low impedance (the drain-to-source path of the FET device) thereby to provide in operation a low-voltage drop that is lower than the ON-voltage drop of a standard diode.

Each embodiment also includes a second gated FET switching device which is controlled to be ON when the first-mentioned device is OFF and to be OFF when the first device is ON. Advantageously, both FET devices are turned ON and OFF by associated light-activated elements connected to the gate electrodes thereof.

In each DC-to-DC converter that embodies the principles of the present invention, the aforementioned inductor is connected during a first interval of time via one of the FET devices to a relatively high DC voltage to be converted down. During a second interval of time, the one device is turned OFF and the other FET device is turned ON. During this second interval, current is supplied to the output capacitor by the inductor via the FET device that shunts the aforespecified diode.

BRIEF DESCRIPTION OF THE DRAWING

A complete understanding of the present invention and of the above and other features thereof may be gained from a consideration of the following detailed description presented hereinbelow in connection with the accompanying drawing, in which.

DETAILED DESCRIPTION

Figure 1:
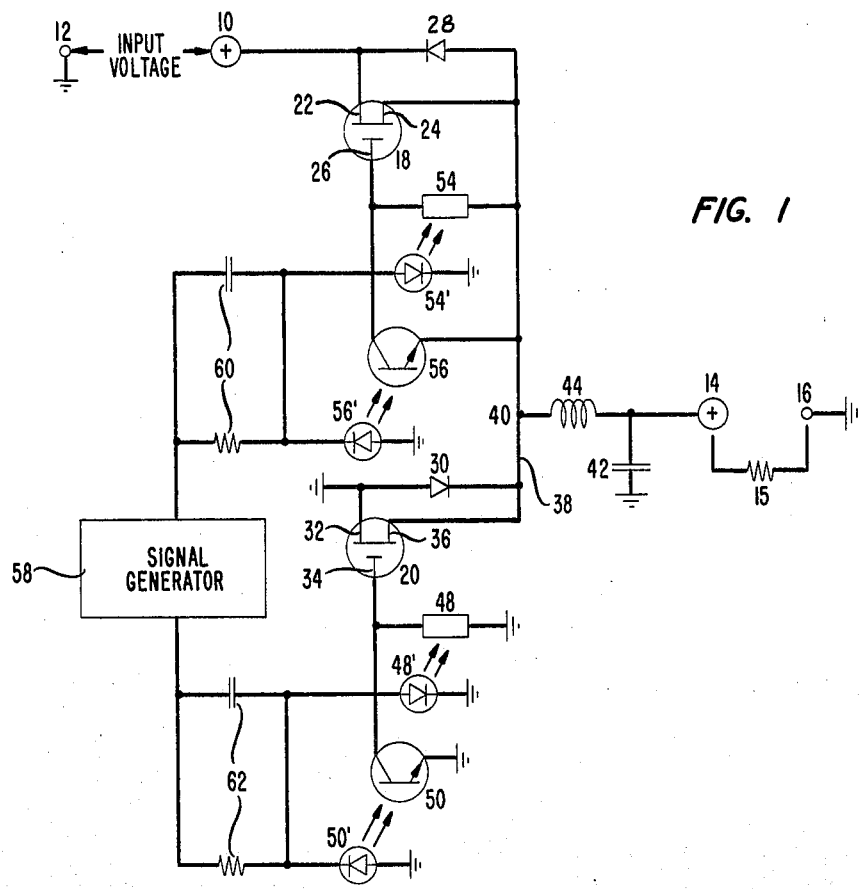
FIG. 1 is a schematic diagram of a specific illustrative DC-to-DC converter made in accordance with the principles of the present invention.

The circuit shown in FIG. 1 is designed to convert a relatively large positive DC voltage applied to input terminals 10 and 12 to a relatively small positive DC voltage which appears between output terminals 14 and 16. In one specific illustrative embodiment, the DC voltage applied to input terminal 10 was +24 volts with respect to a point of reference potential (such as the grounded terminal 12). In that particular case, the DC voltage appearing at output terminal 14 was maintained at +2.5 volts with respect to ground. A load to be connected between output terminals 14 and 16 is schematically represented in FIG. 1 by resistor 15.

Figure 2:
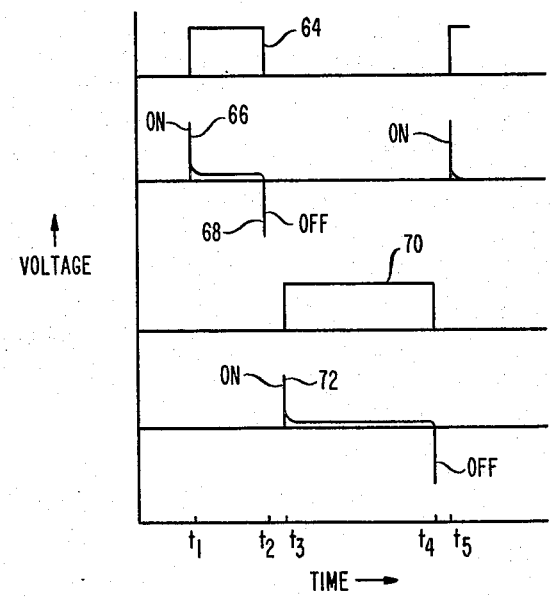
FIG. 2 shows the waveforms of timing signals utilized to control the FIG. 1 converter.

The converter circuit of FIG. 1 includes two switching devices 18 and 20. Illustratively, each of these devices is a conventional power FET of a particular type that is described in the published literature and is commercially available. Typical such devices designated Sipmos FETs, made by Siemens A G, Munich, West Germany, are described on pages 145 through 147 of *Electronics*, Aug. 28, 1980, in an article entitled "Power MOS FETs Run Directly Off TTL". Similar power FET devices designated HEXFETs, made by International Rectifier Corporation, El Sequndo, California, are described on pages J2-1 through J2-11 of *Proceedings of the Seventh National Solid-State Power Conversion Conference*, March, 1980, in an article entitled "Using the Power MOSFET's Integrated Reverse Rectifier". (See the June 7, 1979 issue of *Electronic Design* for a further description of the HEXFET device.) So-called VMOS power FET devices are also known; an illustrative such device is depicted in FIG. 2 of a copending commonly assigned application designated Ser. No. 152,483, filed May 22, 1980 for W. C. King, D. J. Lynes, C. E. Riehm, Jr. and S. G. Waaben, now U.S. Pat. No. 4,319,144.

Each of the aforespecified power FET devices actually includes as an integral part thereof a p-n diode connected between the drain and source electrodes of the FET unit. In accordance with one aspect of the principles of the present invention, it is advantageous to use such a composite FET-diode device for the switches included in the DC-to-DC converters described herein. Alternatively, however, it is feasible to utilize power FET switches, without built-in diodes, in these converters. In the latter case, an auxiliary diode is connected between the drain and source electrodes of one of the switches, as will be specified in detail below.

Herein, for illustrative purposes, n-channel power FET switching devices are specified throughout. It is to be understood, however, that p-channel devices may be substituted therefor if appropriate corresponding changes in the associated power supplies and control signals are made, in a manner well known in the art. As a practical matter, n-channel rather than p-channel FET devices are generally preferred because of the higher mobility of charge carriers in the n-channel devices.

In FIG. 1, the power FET device 18 includes drain, source and gate electrodes 22, 24 and 26, respectively. If the FET device 18 is of the aforedescribed type that includes a built-in diode, such a diode 28 is internally connected to the drain and source electrodes thereof in the particular manner represented in FIG. 1. If the device 18 does not already include such a diode as an integral part thereof, the diode 28 shown in FIG. 1 is omitted from the depicted converter.

On the other hand, the DC-to-DC converter shown in FIG. 1 does require a diode connected to the drain and source electrodes of the power FET device 20. Such a diode 30 is indicated in FIG. 1.

As discussed earlier above, the device 20 may be of the aforementioned composite type that includes both an FET unit and a diode in the same structure. In accordance with the principles of the present invention, the dioe 30 must be poled as shown in FIG. 1. Accordingly, this means that the electrode 32 which is designated by the manufacturers of such a composite unit as the source electrode will in fact be utilized as the drain electrode when the FET device 20 is turned ON. In response to a positive ON signal applied to gate electrode 34, current will flow from the electrode 32 to the electrode 36 of the device 20 and via lead 38 to node point 40. In this reverse mode of operation, the electrodes 32 and 36 serve as the drain and source, respectively, of the FET device 20.

Alternatively, as specified above, the FET device 20 may be of the type that does not include a built-in diode as an integral part thereof. In that case, an auxiliary diode (also represented by the device 30) is connected between the drain and source electrodes of the device 20.

The converter circuit shown in FIG. 1 also includes a capacitor 42 across which the output voltage of the circuit appears. Further, the depicted circuit includes an inductor 44.

In accordance with a feature of the principles of the present invention, ON-OFF operation of the FET switching devices 18 and 20 of FIG. 1 is advantageously controlled by light-activated networks. Electrically isolated low-voltage operation of the devices 18 and 20 is thereby achieved in a high-speed low-loss way.

By way of example, the light-activated control networks respectively connected to the gate electrodes of the FET switching devices 18 and 20 (FIG. 1) are identical. The network connected to the gate electrode 34 of the device 20 comprises a photo-responsive element 48 and a standard photo-responsive bipolar transistor 50. Similarly, the network connected to the gate electrode 26 of the device 18 comprises a photo-responsive element 54 and a standard photo-responsive bipolar transistor 56.

The photo-responsive elements 48 and 54 each comprise, for example, an array of series-connected photodiodes. In response to light activation, the elements 48 and 54 each generate a voltage that biases the associated FET device to the ON state. An advantageous photodiode array of the type suitable for implementing the elements 48 and 54 is described in a copending commonly assigned application designated Ser. No. 889,261, filed Mar. 23, 1978 for W. C. King. By means of such an array, an ON-voltage signal in the range of approximately 5-to-10 volts is provided.

OFF control of the FET devices 18 and 20 is achieved by the photo-responsive bipolar transistors 56 and 50, respectively. Thus, if, for example, the device 18 is ON in response to an activation signal having been applied to the gate electrode 26 by the element 54, the device 18 can be rapidly deactivated or turned OFF (in, for example, tens of nanoseconds) by applying a light signal to the transistor 56. In response to such a signal, the transistor 56 is temporarily rendered conductive. In turn, the ON transistor 56 provides a path for rapidly discharging the array 54 and capacitances associated with the FET device 18. As a result, the gate-to-drain potential of the device 18 falls below the value needed to maintain the device in its ON state. The device 18 remains in its OFF state until another activating light signal is applied to the element 54.

The element 54 of FIG. 1 is activated by light directed thereat from an associated light source such as a standard light-emitting diode (LED) 54'. In practice, the LED 54' is packaged such that the light output thereof is directed only at the element 54. Similarly, LEDs 48', 50' and 56' are associated with and physically arranged to have their light output impinge only on the correspondingly numbered element 48 and transistors 50 and 56. The LEDs 48', 50', 54' and 56' of FIG. 1 are selectively activated to emit light by applying electrical pulses thereto from a signal generator 58 via differentiating networks 60 and 62.

In operation, the FET device 18 of FIG. 1 is designed to be ON for a specified limited interval of time while the FET device 20 is OFF. During this portion of the overall cycle of operation, current flows from the input terminal 10, through the ON FET device 18 and through the inductor 44 to charge the output capacitor 42. As a result, a positive relatively small output voltage with respect to ground appears at the terminal 14. During this portion of the cycle, no current flows in the lead 38 because the device 20 is OFF and the diode 30 is poled to block current flow downward from the node 40 to ground.

Subsequently, the FET device 18 is turned OFF while the FET device 20 remains OFF for a brief interval. During the interval, current flow to charge the capacitor 42 is maintained by the inductor 44. The clockwise path for this flow includes the diode 30. Next, while the device 18 remains OFF, the device 20 is turned ON, whereby the diode 30 is then shunted by the conductive drain-to-source path of the device 20. Typically, the drain-to-source resistance of the ON device 20 is, for example, only about 50 milliohms. In practical embodiments, this means that the drain-to-source drop approximates only 40 millivolts for a current flow of 0.8 amperes. Such a voltage is far below the normal forward voltage conduction threshold of the diode 30. As a result, the diode 30 normally does not conduct during this portion of the cycle of operation. A very-low-loss charging path for the capacitor 42 is thereby provided.

The aforedescribed operation of the FIG. 1 converter is represented by the waveforms shown in FIG. 2. At time $t_1$, pulse 64 is supplied by the signal generator 58 to the differentiating network 60. In response thereto, a relatively high-amplitude current-spike drive signal 66 is applied to the LED 54'. (Illustratively, the maximum amplitude of the signal 66 is about 50 milliamperes.) As a result, the LED 54' emits a high-intensity short-duration light signal which activates the array 54 to provide an ON signal for the FET device 18. (The FET device 20 is OFF.) Once activated, the array 54 remains so for several seconds or until a low impedance discharge path is provided therefor.

At time $t_2$ (FIG. 2), the pulse 64 ends and a relatively high-amplitude negative-going drive signal 68 is formed by the differentiating network 60. In response to the signal 68, the LED 56' is energized. In turn, light therefrom turns the photo-transistor 56 ON, which rapidly turns the FET device 18 OFF. In one specific illustrative embodiment of applicants' invention, the time interval between $t_1$ and $t_2$ was approximately one microsecond.

Between times $t_2$ and $t_3$ (FIG. 2), the FET devices 18 and 20 are both OFF. During that brief interval of time (which is typically only about 0.1 microseconds) current flows from ground, through the diode 30 to node point 40, from left to right through the inductor 44 and into the output capacitor 42. At time $t_3$, pulse 70 is supplied by the signal generator 58 to the differentiating network 62. In response thereto, at time $t_3$ in response to signal 72, the FET device 20 is turned ON. When the device 20 conducts, the voltage across the diode 30 drops to about 50 millivolts. Accordingly, the diode 30 ordinarily does not conduct between $t_3$ and $t_4$.

Subsequently, after, for example, approximately 9 microseconds, at time $t_4$, the LED 50' is energized which in turn activates the photo-transistor 50 and turns the FET device 20 OFF. For a brief interval, between $t_4$ and $t_5$, the diode 30 again conducts. (The interval $t_4$-$t_5$ is typically only about 0.1 microseconds.) Thereafter, at $t_5$, another cycle of operation of the type specified is reinitiated.

In the specific illustrative case specified herein, the converter is operating in effect at approximately a 100 kilohertz rate. Even higher operating rates are feasible. As the operating rate is increased, the size and cost of the inductor 44 are reduced. Moreover, as the operating rate is increased, the turn-ON losses of the FET devices 18 and 20 decrease.

As indicated above, the diode 30 of FIG. 1 ordinarily does not conduct during the interval $t_3$-$t_4$ (FIG. 2) when the FET device 20 is ON. Importantly, however, during that ON interval the diode 30 protects the device 20 from being damaged by large current surges that may occur in the circuit. When surges do occur, the drain-to-source voltage of the device 20 increases. The maximum value of this voltage, and thus the maximum value of the current surge that can flow through the device 20, is limited by the forward conduction voltage of the diode 30. When the diode conducts, further increases in current are diverted therethrough. In practice, effective protection for the device 20 from being damaged by current surges is thereby provided.

One specific illustrative circuit of the type shown in FIG. 1 and described above was designed to operate at 100 kilohertz and to convert +24 volts DC to +2.5 volts DC. In that particular embodiment, the inductor 44 had a value of approximately 55 microhenries and the capacitor 42 had a value of about 400 microfarads.

Figure 3:
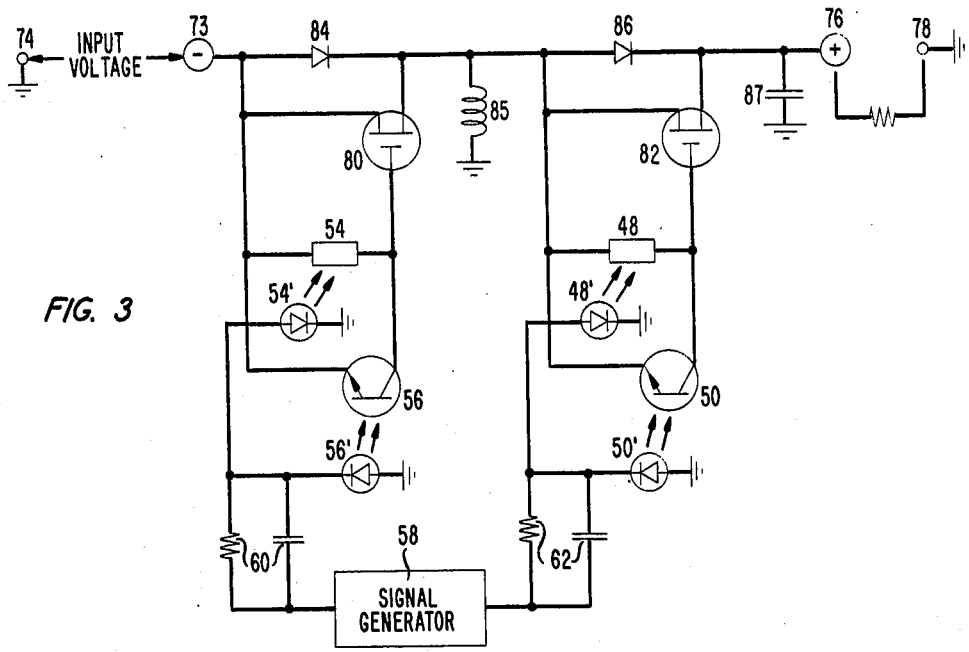
FIG. 3 depicts another specific illustrative DC-to-DC converter that embodies the principles of this invention.

Another specific illustrative embodiment of applicants' invention is shown in FIG. 3. The FIG. 3 circuit is designed to convert a relatively large negative DC voltage to a relatively small positive DC voltage. For purposes of a particular example, it will be assumed that an input of −24 volts DC applied between terminals 73 and 74 of FIG. 3 is to be converted to an output of +2.5 volts DC to appear between terminals 76 and 78. In accordance with the invention, this is advantageously accomplished by utilizing two light-switched FET devices 80 and 82 to control current flow through an inductor 85 and an output capacitor 87 in a manner similar to that specified above in connection with the description of FIG. 1.

As in FIG. 1, the devices 80 and 82 of FIG. 3 may each, for example, be a composite commercially available FET-diode unit of the type specified earlier. Thus, the device 80 is shown with an associated diode 84, and the device 82 is shown with a diode 86. In that case, the device 82 is operated in its reverse mode. The device 80 is operated in its normal forward mode. Alternatively, conventional power FET devices, without built-in diodes, may be utilized for the devices 80 and 82 of FIG. 3. In that case, the diode 86 is a separate element connected between the drain and source electrodes of the device 82, and the diode 84 is omitted from the circuit.

By way of example, each of the FET devices 80 and 82 shown in FIG. 3 includes an associated gate-connected network that is identical to the corresponding network specified above in connection with FIG. 1. Moreover, each of these light-controlled networks is actuated by an LED arrangement identical to the one shown in FIG. 1. Accordingly, the components included in these networks and in the LED arrangement are respectively identified in FIG. 3 by the same reference numerals employed therefor in FIG. 1.

Figure 4:
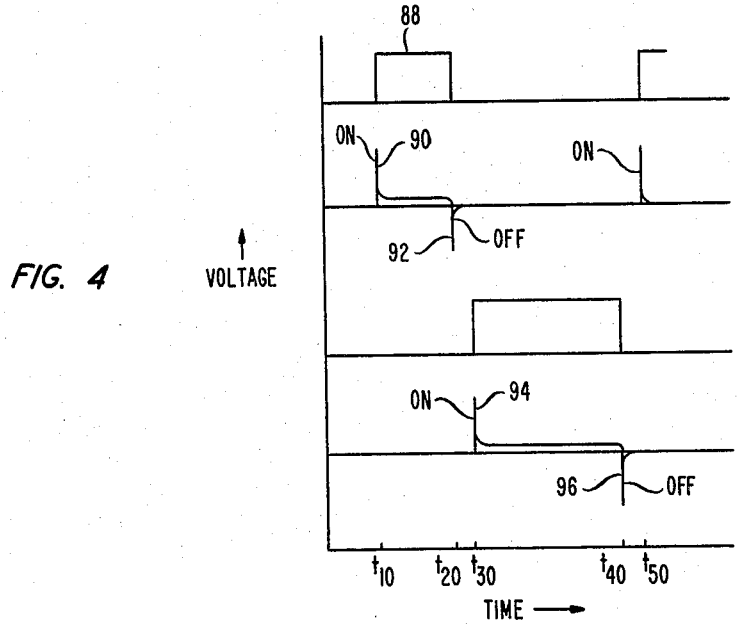
FIG. 4 shows the waveforms of timing signals utilized to control the FIG. 3 converter.

The mode of operation of the FIG. 3 converter can be described with the aid of FIG. 4. Initially, before time $t_{10}$, both of the FET devices 80 and 82 are OFF. At $t_{10}$, the generator 58 supplies a signal 88 to the differentiating network 60 which in turn applies an activation pulse 90 to the LED 54'. As a result, the LED 54' generates a light pulse that is directed at the photoresponsive array 54. In response thereto, the array 54 provides an ON signal to gate the FET device 80 ON. Consequently, current flows from ground, upward through the inductor 85, through the drain-to-source path of the device 80, to the input terminal 73 and back to ground. During this period, the diode 86 is nonconductive. Hence, no current flows into the capacitor 87.

Subsequently, at $t_{20}$ (FIG. 4), the FET device 80 of FIG. 3 is turned OFF in response to pulse 92. Between $t_{20}$ and $t_{30}$, current continues to flow in the depicted circuit. This current flows from ground, upward through the inductor 85, through the diode 86 and into the capacitor 87. At $t_{30}$, in response to pulse 94, the FET device 82 is turned ON. (Typically, the interval $t_{20}$-$t_{30}$ approximates only 0.1 microseconds.) Once the device 82 is activated, the diode 86 is rendered nonconductive and the voltage drop across the device-diode combination falls to a relatively low value, for example only about 50 millivolts for a current flow of 0.8 amperes.

Next, at $t_{40}$ (FIG. 4), in response to pulse 96, the FET device 82 is turned OFF. For a brief interval, typically about 0.1 microseconds, current continues to flow into the capacitor 87 from the inductor 85 via the diode 86. Finally, at $t_{50}$, the FET device 80 is turned ON again, current ceases to flow in the diode 86 and the aforedescribed overall cycle of operation is repeated. While the device 80 is ON, no current flows into the capacitor 87.

One specific illustrative circuit of the type shown in FIG. 3 and described above was designed to be cycled at a rate of approximately 100 kilohertz and to convert −24 volts DC to +2.5 volts DC. In that particular embodiment, the inductor 85 had a value of approximately 55 microhenries and the capacitor 87 had a value of about 400 microfarads.

Finally, it is to be understood that the above-described converters are only illustrative of the principles of the present invention. In accordance with these principles, numerous modifications and alternatives may be devised by those skilled in the art without departing from the spirit and scope of the invention. For example, the converters described herein are well suited to serve as battery charging circuits. In such an application, the battery to be charged would replace the output capacitor 42 (FIG. 1) or the output capacitor 87 (FIG. 3).

We claim:

1. A DC-to-DC converter comprising:
a series-connected combination of an inductor, a switching arrangement and an output element to be charged to a relatively small DC output voltage, said switching arrangement comprising a first FET device having a diode connected between the drain and source electrodes thereof, said diode being poled for forward conduction in the direction in which current is to flow to said element via said device,
means including a second FET device for connecting a relatively large DC input voltage to said inductor to establish a current flow therethrough,
and means connected to said first and second FET devices for controlling said second device to be ON when said first device is OFF thereby to establish current flow through said inductor and for controlling said first device to be ON when said second device is OFF thereby to establish current flow from said inductor to said element via the drain-to-source path of said first device.

2. A converter as in claim 1 wherein said controlling means comprises light-activated networks respectively connected to the gate electrodes of said first and second FET devices.

3. A converter as in claim 2 wherein each of said networks comprises a light-responsive element for generating a voltage to turn ON the FET device to which the network is connected.

4. A converter as in claim 3 wherein each of said networks further comprises a second light-responsive element connected across said first-mentioned light-responsive element for providing, when activated by light, a low impedance discharge path for said first-mentioned light-responsive element, whereby the FET device to which the network is connected may be thereby turned OFF.

5. A converter as in claim 4 further including two LEDs respectively associated with the light-responsive elements in each of said networks.

6. A converter as in claim 5 wherein the two LEDs associated with each of said networks are connected in parallel, are oppositely poled and are electrically driven via a differentiating network by a generator that supplies rectangular-shaped signals.

7. A DC-to-DC converter comprising:
a source of input voltage,
an output element to be charged,
means including a first FET device connected in series with an inductor for applying charge to said element from said source when said device is ON,
a parallel combination comprising a second FET device and a diode connected between the drain and source electrodes of said second device,
means connecting said parallel combination in parallel with said inductor and element, said diode being poled to block current flow therethrough when said first-mentioned FET device is ON,
and means connected to said first and second FET devices for gating said first device ON when said second device is OFF thereby to establish current flow through said inductor to said element and for gating said first device OFF when said second device is ON thereby to establish current flow from said inductor to said element via the drain-to-source path of said second device.

8. A DC-to-DC converter comprising:
a source of input voltage,
an output element to be charged,
means including a first FET device connected in series with an inductor for establishing current flow through said inductor from said source when said device is ON,
a series combination comprising said output element and a switching arrangement, said switching arrangement comprising a second FET device having a diode connected between the drain and source electrodes of said second device,
means connecting said series combination in parallel with said inductor, said diode being poled to block current flow therethrough when said first FET device is ON,
and means connected to said first and second FET devices for gating said first device ON when said second device is OFF thereby to establish current flow through said inductor and for gating said first device OFF when said second device is ON thereby to establish current flow from said inductor to said element via the drain-to-source path of said second device.

* * * * *